March 24, 1959     T. J. BUSCH     2,878,696
REAMING AND DE-BURRING TOOL
Filed Dec. 30, 1957
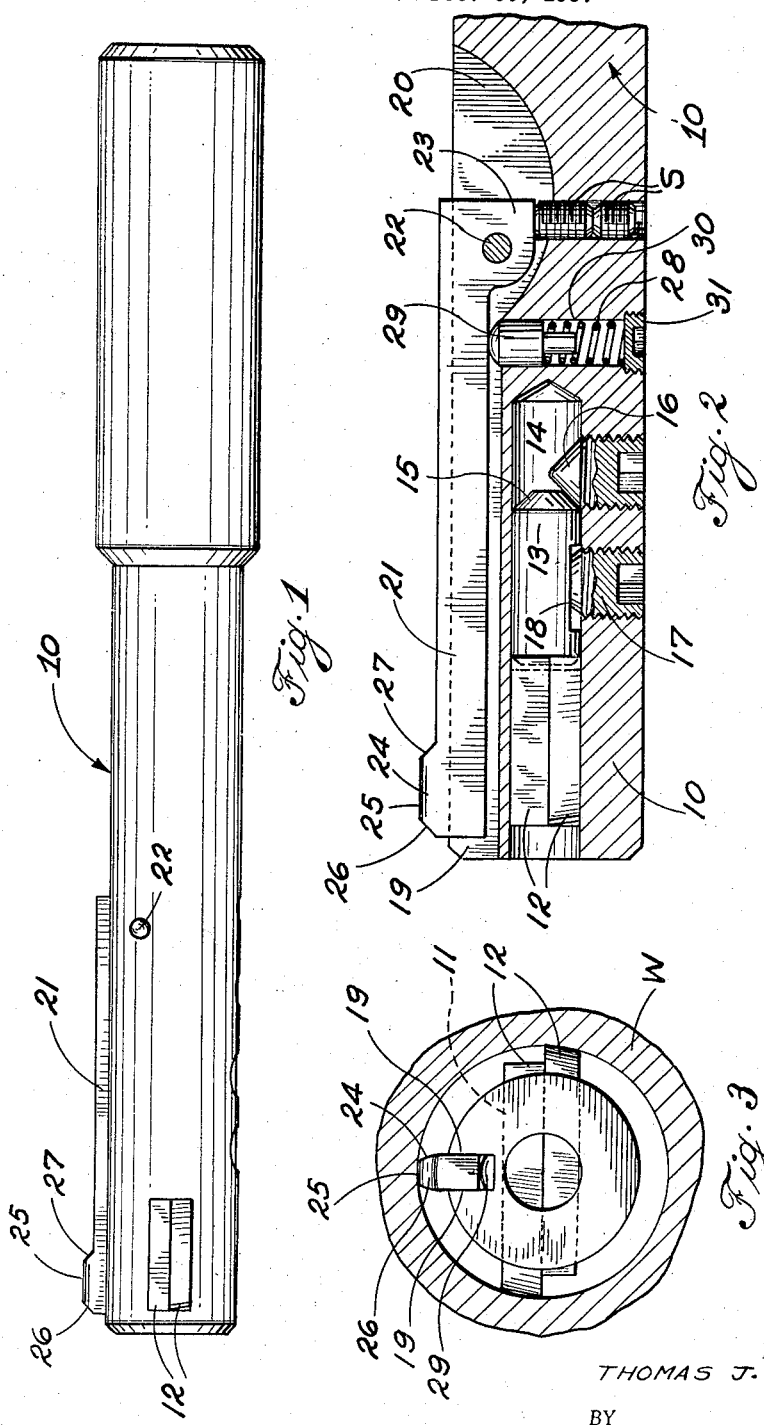
INVENTOR.
THOMAS J. BUSCH
BY RICHEY, WATTS, EDGERTON,
McNENNY & FARRINGTON.
ATTORNEYS United States Patent Office …

2,878,696
Patented Mar. 24, 1959

2,878,696

REAMING AND DE-BURRING TOOL

Thomas J. Busch, Macedonia, Ohio, assignor to Maxwell Industries, Inc., Macedonia, Ohio, a corporation of Ohio Application December 30, 1957, Serial No. 705,923

2 Claims. (Cl. 77—73.5)

This invention relates broadly to metal working tools and more specifically to boring bars having radial cutters therein for boring a cylindrical hole, and a chamfering tool for beveling the forward and rearward edges of the hole as it enters or is retracted from the work.

The object of the invention is to provide a boring bar having transaxial adjustable cutters therein, and a second cutter constituting a chamfering tool disposed in a pariaxial groove in the bar which will automatically recede into the groove after the initial chamfering operation thereof and automatically protrude beyond the bar and chamfer the rearward edge of the hole or shoulder in the work when the bar is withdrawn from the workpiece.

Other objects and advantages more or less ancillary to the foregoing, and the manner in which all the various objects are realized, will appear in the following description, which considered in connection with the accompanying drawings, sets forth the preferred embodiment of the invention.

Referring to the drawings:

Fig. 1 is a side elevational view of the improved boring bar embodying the invention;

Fig. 2 is a longitudinal section of a fragmentary portion thereof, shown on an enlarged scale; and Fig. 3 is an end elevational view of the bar shown in Fig. 2, and a sectional view of a fragmentary portion of the workpiece.

Referring first to Fig. 2, the boring bar 10 is machined with a transverse rectangular slot 11 for the reception of a pair of cutter blades 12 which protrude beyond the circumference of the bar and are held in adjusted position by the engagement of a plunger 13 slidably engaged in an axial bore 14 in the bar. The plunger is formed with a tapered inner end 15 engaged with the conical end of a set screw 16 threaded in the body of the bar and locked in place by a set screw 17 abutting a land 18 machined in the body of a plunger. The bar 10 is further machined with a longitudinal groove 19 in the circumferential face thereof normal to the major axis of the slot 11. The inner end of the groove is merged with an arcuate recess 20 having the side walls thereof common to the side walls of the groove. A chamfering cutter blade 21 is pivotally mounted in the groove upon a pin 22 seated in a cross bore in the bar and extended through an enlarged inner end portion 23 of the cutter blade. The base of the enlarged end 23 is flat and engaged with a screw S to delimit the outer movement of the chamfering tool. The outer end of the cutter blade 21 is formed with a vertically disposed lug 24 having a transversely arcuate top surface 25 struck from a radius equal to that of the hole to be bored by the cutter blades 12. The lug is further formed with outwardly convergent front and rear walls 26 and 27 respectively backed off to cut the edge of the hole in the workpiece W upon the initial entry or withdrawal thereof or the edge of a shoulder within the bore upon withdrawal of the tool. The free end of the cutter blade 21 is urged outwardly from the groove 19 by a compression spring 28 engaging a pin 29 abutting the lower face of the cutter bar which is mounted in a cross bore 30 in the enlarged end 23 adjacent the pin 22. The spring is retained by a set screw 31 threaded in the body of the bar.

As the boring bar enters the opening in the workpiece, the cutters 12 will start to size the opening therein, and immediately thereafter the outer tapered edge 26 of the lug 24 will engage the outer edge of the opening and cut the metal away until the translation of the bar and the angular face of the lug forces the chamfering blade 21 into the groove 19. As the lug 24 leaves the bar, the spring 28 will elevate the free end of the chamfering blade outwardly. When the boring bar is retracted from the hole in the work, the rearward edge of the hole or the edge of a shoulder within the opening will be engaged by the tapered edge 27 of the lug and cut the stock away until the blade is again forced inwardly into the groove 19. When the cutter blade is in its retracted position within the groove, the arcuate land or top surface 25 thereof will ride through the hole in the work without scarring the cylindrical wall thereof.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

What is claimed is:

1. A tool for boring and simultaneously chamfering the edges of a hole in a workpiece comprising a boring bar, cutter blades in said bar, means in said bar for the radial adjustment of said cutter blades, said bar having a longitudinal groove in the circumferential face thereof, a chamfering tool mounted at the inner end thereof for pivotal movement in said groove, a cross pin in said bar for said chamfering tool a lug on the forward end of said chamfering tool, tapered front and rear cutting edges on said lug, a land on the top of said lug curved to the form of the hole in the workpiece, a spring in said bar forward said pin and engaged with said chamfering tool urging the free end of said chamfering tool out of said groove, means engaged with said spring to vary the pressure thereof, and a screw in said bar rearward said pin and engaged with said tool to delimit the outward movement of said chamfering tool.

2. A tool for boring and simultaneously chamfering the edges of a hole in a workpiece comprising a boring bar, radial cutters therein, said bar having a lineal groove in the circumferential face thereof, a chamfering tool pivoted adjacent its inner end in said groove, a cross pin therefor said chamfering tool comprising a bar, a truncated prismoidal lug in the outer end thereof, a land on the top of said lug, a curved transverse face on said land, the radius thereof being equal to the radius of the bore made by said radial cutters, and a spring in said bar forward said pin engaged with said chamfering bar urging the free end thereof out of said groove, and a screw in said bar rearward said pin and engaged with said chamfering bar to delimit the outward movement thereof.

References Cited in the file of this patent

UNITED STATES PATENTS

| | | |
|---|---|---|
| 2,373,474 | Heyer | Apr. 10, 1945 |
| 2,408,891 | Steiner | Oct. 8, 1946 |
| 2,620,689 | Cogsdill | Dec. 9, 1952 |